United States Patent [19]

Nagengast

[11] Patent Number: 4,991,067

[45] Date of Patent: Feb. 5, 1991

[54] HEADLAMP ASSEMBLY

[75] Inventor: William E. Nagengast, Anderson, Ind.

[73] Assignee: General Motors Corporation, Detroit, Mich.

[21] Appl. No.: 394,918

[22] Filed: Aug. 17, 1989

[51] Int. Cl.[5] .................... B60Q 1/00

[52] U.S. Cl. .................... 362/61; 362/226

[58] Field of Search .................... 362/61, 80, 226, 306, 362/457, 374, 375, 296

[56] References Cited

U.S. PATENT DOCUMENTS 4,760,506 6/1988 Mochizuki et al. .................... 362/61

4,819,133 4/1989 Kochi et al. .................... 362/61

4,819,142 4/1989 Lothamer et al. .................... 362/61

4,841,419 6/1989 Ohishi .................... 162/61

4,851,976 7/1989 McMahan et al. .................... 362/61

*Primary Examiner*—Stephen F. Husar

*Assistant Examiner*—Didnd M. Cox

*Attorney, Agent, or Firm*—Edward J. Biskup

[57] ABSTRACT

A headlamp assembly having a retainer for a replaceable light bulb that can be positioned on the reflector housing from either side of the retainer and in various rotational positons thereof and still serve to receive and maintain the light bulb in the proper position relative to the reflector housing.

4 Claims, 1 Drawing Sheet

HEADLAMP ASSEMBLY

This invention concerns headlamps and more particularly relates to a vehicle headlamp having a retainer for maintaining a replaceable light bulb within a socket formed in the rear of a headlamp reflector.

More specifically, the vehicle headlamp according to the present invention includes a reflector the front portion of which is formed with a cavity having a parabolic reflecting surface and a circular opening formed in the reflecting surface for receiving the light bulb of a replaceable lightbulb assembly. A plurality of circumferentially equally spaced and axially outwardly extending projections are integrally formed with the rear portion of the reflector and surround the circular opening. A retainer for receiving the replaceable lightbulb assembly is secured to the projections and has the configuration of a ring the opposed sides of which are formed with locator means which register with the projections for positioning the retainer relative to the circular opening in the reflecting surface of the reflector. In addition, a plurality of circumferentially spaced ramp portions are formed on the retainer on the opposed sides thereof for engaging and pressing a portion of the lightbulb assembly towards the opening when the lightbulb assembly is located within the retainer. The arrangement is such that either side of the retainer can be secured to the projections in any rotational position of the retainer and permit the lightbulb assembly to be properly located within the circular opening relative to the reflecting surface.

The following patents show headlamp assemblies which include lamp bulb retainers that have certain structural similarities to the present invention:

| | | |
|---|---|---|
| U.S. 4,760,507 | Mochizuki et al, | issued July 26, 1988 |
| U.S. 4,384,314 | Blaisdell et al, | issued May 17, 1983 |
| U.S. 4,794,500 | Bradley, | issued Dec. 27, 1988 |
| U.S. 4,747,029 | Liverance et al, | issued May 24, 1988 |
| U.S. 4,829,408 | Haydu, | issued May 9, 1989 |

The objects of the present invention are to provide a new and improved retainer for a replaceable light bulb that takes the form of a ring and in which the opposed sides of the retainer are formed with identical locator means so as to allow either side of the retainer to be secured to the reflector for receiving the light bulb; to provide a new and improved vehicle headlamp having a reflector provided with a plurality of circumferentially equally spaced and axially outwardly extending projections formed on the rear of the reflector surrounding a socket and in which a ring-like retainer for a replaceable light bulb has locator means on both sides thereof that are adapted to be secured to the projections and serve to orient the retainer relative to the socket; to provide a new and improved vehicle headlamp having a ring-like retainer for a replaceable light bulb that can be positioned onto the reflector from either side of the retainer and in various rotational positions thereof and still serve to receive and maintain the replaceable light bulb in a proper location relative to the reflector; and to provide a new and improved vehicle headlamp assembly having a ring-like retainer secured to the reflector for receiving a replaceable light bulb and that is characterized in that the retainer is formed with three circumferentially equally spaced locator means and ramp means on both sides of the retainer so as to allow the retainer to be fastened to the reflector without concern as to which of the two sides is the proper side for receiving the light bulb.

Other objects and advantages of the present invention will be apparent from the following detailed description when taken with the drawings in which FIG. 1 is a side elevational view showing a partial vehicle headlamp incorporating a replaceable lightbulb assembly located within a retainer and made according to the present invention;

Figure 1:
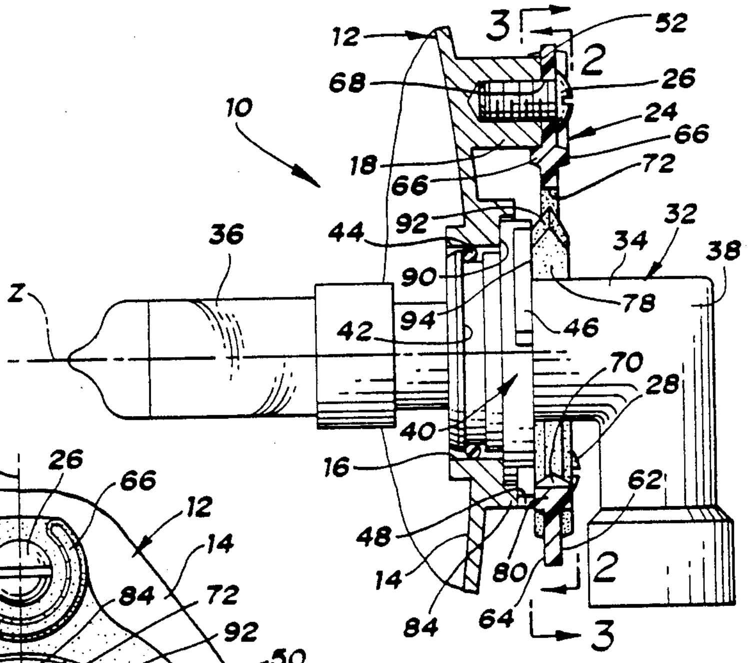
Figure 3:
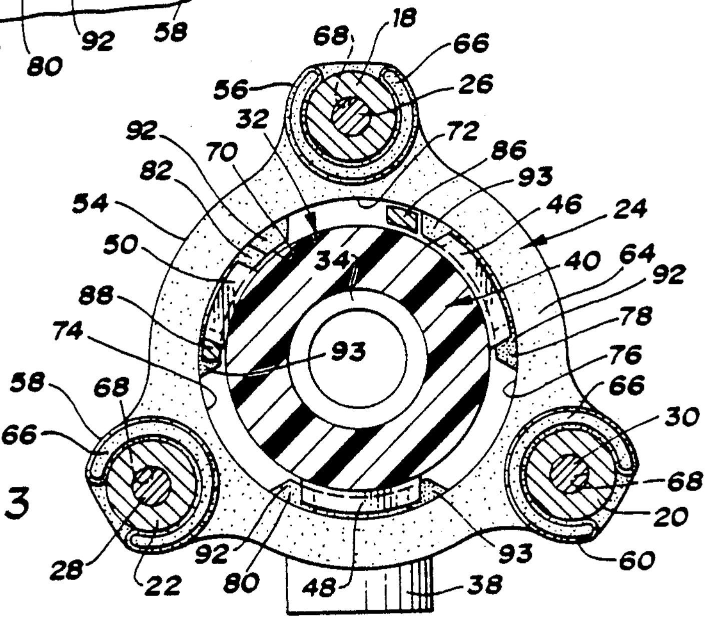
FIG. 3 is a view of the retainer taken on line 3—3 of FIG. 1.

Referring now to the drawings and more particularly FIG. 1 thereof a vehicle headlamp assembly 10 made in accordance with the present invention is shown having the usual reflector 12 which is only partially shown. The reflector 12 is made of plastic and provided with a cavity having an aluminized parabolic reflecting surface 14. The central rear portion of the reflector 12 is formed with a circular opening 16 which, as seen in FIG. 3, is surrounded by three identical circumferentially equally spaced cylindrical projections or bosses 18, 20 and 22 each of which projects axially rearwardly from and is integral with the body of the reflector 12. A retainer 24 is secured to the projections 18–22 at the rear of the reflector 12 by three identical screws 26, 28 and 30 and serves to support a replaceable lightbulb assembly 32. The retainer 24 is located on the reflector 12 in a manner so as to assure that the filament of the light bulb is positioned in a predetermined position relative to the focal point of reflecting surface 14. Also, the retainer 24, when mounted and secured to the reflector 12, can serve to receive and position either a type HB3 or HB4 standardized replaceable light bulb approved for use by U.S. Motor Vehicle Safety Standard No. 108. Lightbulb assembly 32 is of this type and as seen in FIG. 1, lightbulb assembly 32 includes a base portion 34 made of insulating material, such as plastic, that receives and supports a wedge-type glass capsule 36. The base portion 34 of the lightbulb assembly 32 includes a 90° angled connector portion 38 that electrically connects to the plug end of a wire harness (not shown) of a motor vehicle for providing electrical current to the filament in the capsule 36. The base portion 34 is also integrally formed with a collar 40 having an outer diameter larger than the diameter of the opening 16 formed in the reflector 12. A neck portion 42, integrally formed with the base portion 34, carries an "O" ring 44 which assures that a snug fit is provided in the opening 16 of the reflector 12 when the neck portion 42 is inserted into the opening 16. It will also be noted that the collar 40 is integrally formed with three radially outwardly extending and circumferentially spaced retainer members 46, 48, and 50. The retainer members 46 and 48 are identical in size and configuration while the retainer member 50 is smaller in size and assures that the lightbulb assembly is properly located in the reflector 12.

As aforementioned, the opening 16 is surrounded by the projections 18–22 which are integrally formed with the rear of the reflector 12. The outer peripheral surface of each projection 18–22 serves to properly locate the retainer 24 along an X axis and a Y axis while a flat annular seating surface 52 on each projection 18–22 serves to locate the retainer along a Z axis. In order to do so the longitudinal center axis of each projection 18–22 is located on a common circle which is concentric with respect to the opening 16. The seating surface 52 of each projection, on the other hand, is located in a plane which is substantially perpendicular to the longitudinal center axis of the opening 16.

The retainer 24 is ring-like in configuration, made of a plastic material, and has an annular body portion 54 the periphery of which is formed with three identical mounting arms 56, 58 and 60 which are circumferentially equally spaced from each other. The body portion 54 is plate like in configuration having spaced side surfaces 62 and 64 located in parallel planes. Each side surface 62 and 64 of each arm 56–60 has an outwardly projecting circular locator portion 66 formed therewith, the inner surface of which is of the same diameter as the outer diameter of each of the projections 18–22. A circular opening 68 concentric with the aforesaid inner surface is formed in the center of each locator portion 66 for receiving one of the screws 26–30. The centers of each adjacent pair of locator portions 66 are angularly spaced from each other 120° which is the same spacing between the longitudinal center axes of each pair of adjacent projections. In addition, the body portion 54 is formed with a central circular opening 70 surrounded by three radially extending access slots 72, 74 and 76 which are of identical in size and configuration and the centers of each adjacent pair of which are also angularly spaced 120° from each other. Also, each side surface 62 and 64 of the body portion 54 is integrally formed with three arcuate press or ramp portions 78, 80, and 82 each of which extends outwardly from the associated side surface of the retainer 24 as seen in FIG. 1. Each ramp portion 78–82 starts at one access slot with tapered ends 92 and terminates at the adjacent access slot with identical tapered ends 93.

Figure 2:
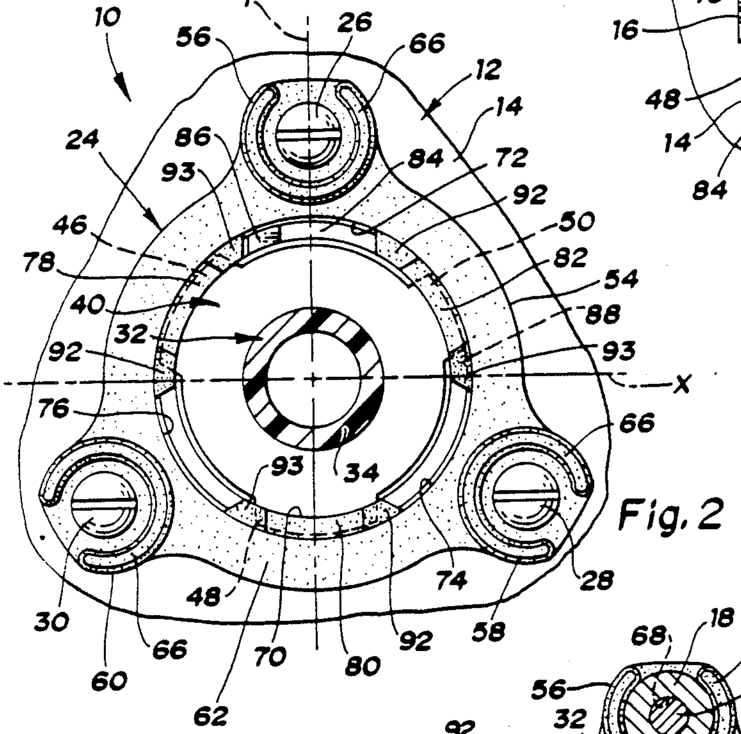
FIG. 2 is a rear view of the retainer taken on line 2—2 of FIG. 1.

As should be apparent, the access slots 72–76 are adapted to receive the retainer members 46–50 of the lightbulb assembly 32 and, in order to permit the lightbulb assembly 32 to be properly oriented rotationally when installed in the retainer 24, a flange 84 formed with the reflector 12 and surrounding the opening 16 is provided with an integrally formed filler member 86 and a stop member 88. In this case, the filler member 86 is located on the flange 84 in the position shown in FIGS. 2 and 3 so as to extend into and limits the size of access slots 72. Also, the stop member 88 is located on the flange 84 so that the connector portion 38 is rotationally oriented in a desired position. Thus, when the retainer 24 is fastened to the reflector 12 as seen in the drawing and the lightbulb assembly 32 is to be inserted into the opening 16, the retainer member 50 on the collar 40 is aligned with the access slot 72 having the filler member 86 and the lightbulb assembly 32 is inserted axially so that the neck portion 42 thereof enters the opening 16 until the collar 40 contacts a stop surface 90 surrounded by the flange 84. In this position, the filament in the capsule 36 is located in the desired predetermined position relative to the reflector 12. The base portion 34 of the lightbulb assembly 32 is then rotated clockwise as seen in FIG. 2 causing the retainer members 46–50 to initially contact the tapered end 92 of each ramp portion 78–82 respectively causing that portion of the retainer 24 to flex rearwardly. As the base portion 34 of the lightbulb assembly 32 continues to be rotated in a clockwise direction, each retainer member 46–50 will move over the tapered end 92 of the associated ramp portion and slide along the flat section 94 of the associated ramp portion. This causes the portion of the retainer 24 between each pair of adjacent mounting arms (such as the portion between mounting arms 56 and 58; 58 and 60; and 60 and 56) to flex rearwardly and act as a spring causing the flat section 94 to press the associated retainer member and, accordingly, the collar 40 into firm contact with the stop surface 94 which lies in a plane parallel to the plane passing through the seating surfaces 52 of the projections 18–22. The base portion 34 of the lightbulb assembly 32 will be restrained from further clockwise rotation when the retainer member 50 contacts the stop member 88 as seen in FIGS. 2 and 3. The lightbulb assembly 32 will then assume the position seen in FIGS. 1 through 3 and is prevented from further clockwise movement by the stop member 88. At this point the lightbulb assembly 32 is in proper orientation along the X, Y and Z axes relative to the reflecting surface 14 and the connector portion 38 is in the desired rotational position for connection with the wire harness of the motor vehicle.

Thus from the above description it should be apparent that each side of the retainer 24 is identical in construction. Accordingly, the retainer 24 can be mounted on the projections 18–22 from either side and, inasmuch as the centers of the locator portions 66 and the centers of the projections are angularly spaced from each other 120°, the retainer 24 can he located on the projections 18–22 in any rotational position and still permit the lightbulb assembly 32 to be properly located within the opening 16 and have the connector portion 38 properly positioned for connection with the wire harness of the vehicle.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. In combination, a vehicle headlamp assembly including a reflector the front portion of which is formed with a cavity having a parabolic reflecting surface and a circular opening formed in said reflecting surface for receiving the light bulb of a replaceable light bulb assembly, a plurality of circumferentially equally spaced locator receiving portions formed on the rear of said reflector and surrounding said circular opening, a retainer for receiving said replaceable light bulb assembly secured to said locator receiving portions surrounding said circular opening, said retainer having a configuration of a ring the opposed sides of which are formed with locator means which register with said locator receiving portions for positioning said retainer relative to said circular opening, and a plurality of circumferentially spaced press portions formed on said retainer on the opposed sides thereof for engaging and pressing a portion of said light bulb assembly towards said opening when said light bulb assembly is located within said retainer, the arrangement being such that either side of said retainer can be secured to said projections in any rotational position of said retainer and permit said light bulb assembly to be properly located within said circular opening relative to said reflecting surface.

2. In combination, a vehicle headlamp assembly including a reflector the front portion of which is formed with a cavity having a parabolic reflecting surface and a circular opening formed in said reflecting surface for receiving the light bulb of a replaceable lightbulb assembly, a plurality of circumferentially equally spaced and axially outwardly extending projections integrally formed with the rear portion of said reflector and surrounding said circular opening, a retainer for receiving said replaceable lightbulb assembly secured to said projections, said retainer having a configuration of a ring the opposed sides of which are formed with locator means which register with said projections for positioning said retainer relative to said circular opening, and a plurality of circumferentially spaced press portions formed on said retainer on the opposed sides thereof for engaging and pressing a portion of said lightbulb assembly towards said opening when said lightbulb assembly is located within said retainer, the arrangement being such that either side of said retainer can be secured to said projections in any rotational position of said retainer and permit said lightbulb assembly to be properly located within said circular opening relative to said reflecting surface.

3. In combination, a vehicle headlamp assembly including a reflector the front portion of which is formed with a cavity having a parabolic reflecting surface and a circular opening formed in said reflecting surface for receiving the light bulb of a replaceable lightbulb assembly having the radially outwardly extending retainer members formed thereon one of which is smaller than the other two retainer members, a plurality of circumferentially equally spaced and axially outwardly extending projections integrally formed with the rear portion of said reflector and surrounding said circular opening, a retainer for receiving said replaceable lightbulb assembly secured to said projections, said retainer having a configuration of a ring the opposed sides of which are formed with circular locator means which register with said projections for positioning said retainer relative to said circular opening, a plurality of circumferentially spaced portions formed on said retainer on the opposed sides thereof for enaging and pressing a portion of said lightbulb assembly towards said opening when said lightbulb assembly is located within the said retainer, said retainer having three identical access slots for receiving said retainer members of said lightbulb assembly, and a filler member formed on said reflector and adapted to be located in one of said access slots, the arrangement being such that either side of said retainer can be secured to said projections in any rotational position of said retainer and permit said lightbulb assembly to be properly located within said circular opening relative to said reflecting surface.

4. In combination, a vehicle headlamp assembly including a reflector the front portion of which is formed with a cavity having a parabolic reflecting surface and a circular opening formed in said reflecting surface for receiving the light bulb of a replaceable lightbulb assembly, at least three circumferentially equally spaced and axially outwardly extending projections integrally formed with the rear portion of said reflector and surrounding said circular opening, a retainer for receiving said replaceable lightbulb assembly secured to said projections, said retainer including a base portion having a configuration of a ring and having three circumferentially equally spaced mounting arms the opposed sides to each of which is formed with locator mean which register with any one of said projections for positioning said retainer relative to said circular opening, the free end of each of said projections being identical in configuration, and a plurality of circumferentially spaced press portions formed on said retainer on the opposed sides thereof for engaging and pressing a portion of said lightbulb assembly towards said opening when said lightbulb assembly is located within the said retainer, the arrangement being such that either side of said retainer can be secured to said projections in any rotational position of said retainer and permit said lightbulb assembly to be properly located within said circular opening relative to said reflecting surface.

* * * * *